Feb. 15, 1972   F. V. MALTBY   3,642,973
METHOD FOR THE PRODUCTION OF FOOTWEAR OR PARTS THEREOF
Filed March 19, 1969   4 Sheets-Sheet 1

INVENTOR
FRANK VINCENT MALTBY

BY Holman, Glascock, Downing, Seebold
ATTORNEYS

INVENTOR
FRANK VINCENT MALTBY

BY Yeoman, Glasovek, Downing & Seebold
ATTORNEYS

United States Patent Office 3,642,973
Patented Feb. 15, 1972

3,642,973
METHOD FOR THE PRODUCTION OF FOOTWEAR OR PARTS THEREOF
Frank Vincent Maltby, Don Mills, Ontario, Canada, assignor to Bata Shoe Company, Inc., Belcamp, Md.
Filed Mar. 19, 1969, Ser. No. 808,628
Int. Cl. B29h 7/08
U.S. Cl. 264—244
13 Claims

ABSTRACT OF THE DISCLOSURE

A method for the production of an article of footwear or parts thereof from one or more molding materials, wherein the molding material is injected through a sprue hole into a two-part mold substantially surrounding a lasting member and having an enlarged opening spaced from the sprue hole. A plurality of closure members, each having a different molding surface on its interior, are sequentially aligned in sealing relationship to the opening to thereby permit molding of successive layers or portions of the article of footwear. A plurality of such molds and closure members may advantageously be mounted on a rotatable turret and successively presented to one or more stationary injectors.

BACKGROUND OF THE INVENTION

The present invention relates to the manufacture of articles of footwear or parts thereof and more particularly to a method for the manufacture of articles of footwear or parts thereof using injection molding techniques.

It is known to form a sole and heel assembly onto a shoe upper member positioned on a last by injecting a thermoplastic or thermosetting vulcanizable molding material into a cavity formed adjacent the sole area of the last upper by a number of mold members. After the molding material in the cavity has solidified or substantially solidified, the mold members are then removed and the article of footwear having a sole molded thereon is removed from the last.

It is also known to form a heel and sole on an article of footwear by injecting a first molding material into a cavity formed adjacent the bottom of a lasted upper, and after solidification or partial solidification of the first molding material, providing a second molding cavity adjacent the bottom of the article and the previously injected material and injecting a second molding material into the second cavity.

The articles produced by such procedures are most satisfactory, but production is limited by the number of injections that can be performed on a single article, and also by the fact that to open the side mold members to work on the article on the last between injections is very difficult and undesirable because of their general designs.

SUMMARY OF THE INVENTION

The present invention relates to a method for three or more injections resulting in a more quickly and economically produced and better quality article.

The apparatus for carrying out the instant inventive method preferably includes a turn-table or rotatable turn-table indexed for rotational movement through three or more injection stations positioned around the periphery of the table. A plurality of individual article-forming stations are located on the table, with each station consisting of a stationary lasting member having an exterior configuration corresponding to the desired interior configuration of the finished article, two side mold members mounted for movement toward and away from the lasting member, and three or more closure members mounted for closing engagement with the lasting member and side molds to define in sequence therewith three or more molding cavities into which molding material is injected. An additional feature of this apparatus is that external pressure is applied to the mold cavity forming members independently of the mold closing mechanism.

The invention makes it possible to perform one, two, three or more article building injections on a single machine resulting in increased production with better quality at a reduced cost.

In a preferred embodiment, each station on the table is provided with three closure members defining in turn three different injection cavities into which molding material is injected by three injection molding assemblages, but it is possible to provide four or more closure members and four or more injection molding assemblages without departing from the scope of the invention.

It is a principal object of the present invention to provide a method for the manufacture of articles of footwear or parts thereof using a three stage injection technique.

It is another object of the present invention to provide a method for the manufacture of articles of footwear or parts thereof having various components formed of molding material, with each component having been formed individually by an injection molding technique in sequence upon the same machine.

It is still a further object to provide a method for the manufacture of articles of footwear or parts thereof, comprising positioning a lasting member and mold members and a first closure member to constitute a first molding cavity, injecting a molding material into the first cavity, and removing the first closure member from first cavity forming position and positioning a second closure member with respect to the lasting member and the mold members to define a second molding cavity, and injecting molding material into the second cavity, removing the second closure member from the second cavity forming position and positioning a third closure member with respect to the lasting member and the mold members to provide a third molding cavity, and injecting molding material into the third cavity.

These and other objects will become apparent from the following description in conjunction with the accompanying drawings wherein:

DETAILED DESCRIPTION OF THE INVENTION

Figure 1:
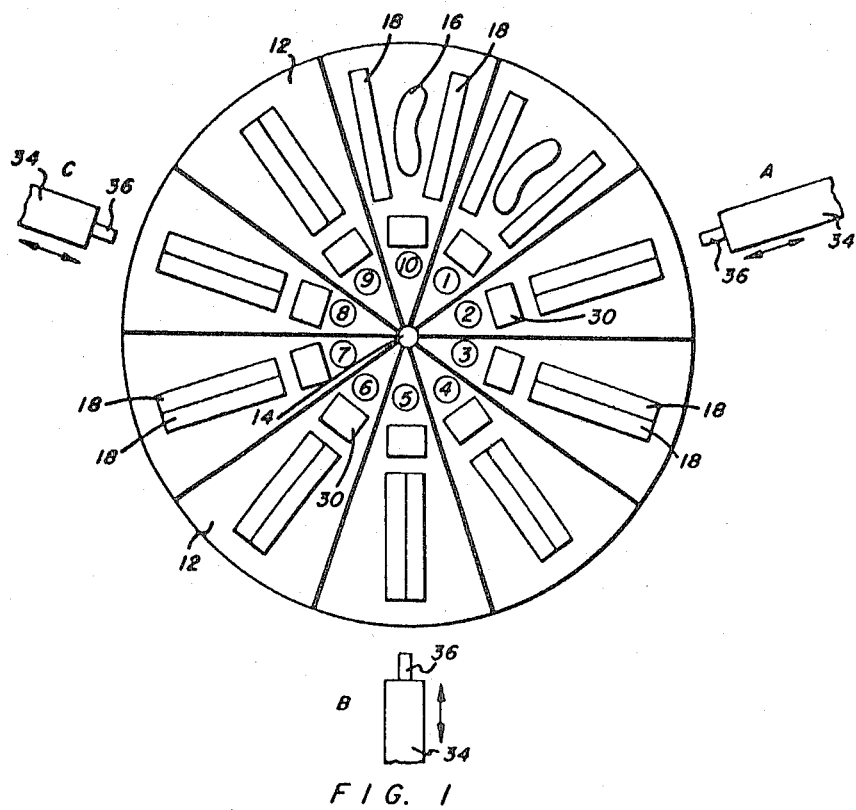
FIG. 1 is a diagrammatic plan view of an apparatus for performing the method according to the invention.

Referring particularly to the drawings, a preferred form of apparatus for performing the method of the invention comprises a turn-table 12 mounted for rotation about a vertical axis 14. Rotation of the table may be effected by an electric motor (not shown) and the movement of the table may be controlled by a timing mechanism or manually. The table top is divided into a plurality of individual stations and while ten such table station positions are shown, the number may vary.

The table stations for illustrative purposes are numbered 1 to 10, and each station consists of a stationary lasting member 16 and two side mold members 18 mounted for movement toward and away from the lasting member 16. The inside surface of each side mold 18 facing the lasting member is recessed corresponding to the side shape of the lasting member for enabling the mold members to close tightly against the lasting member as shown for example at table station 3 in FIG. 1. The mold members at each station, when in their closed positions, define at their upper side an opening 56 into which each of the closure members, to be described more fully directly hereunder, is sequentially received. Each station is also provided with three closure members 20, 22 and 24 (see FIG. 2) for selective engagement with the lasting member 16 and side mold members 18, fitting in turn within the opening 56, to define therebetween an injection cavity. Each of the three closure members 20, 22 and 24 has a different molding configuration and each closure member, when received within the opening 56 and closed with the lasting and side mold members, will define a different molding cavity for receiving molding material.

The mold members 18 at each station include an injection port or mold injection passageway 42, preferably disposed along the parting line therebetween, and extending from the exterior thereof to the periphery of the opening 56. Further, each of the closure members 20, 22 and 24 includes a respective closure injection passageway indicated as first, second, and third closure injection passageways 50, 52 and 54, respectively. Each of these passageways extends from the exterior of its respective closure member to the lower side surface of such closure member facing the lasting member 16, such lower side surfaces of the closure members defining respective first, second, and third molding surfaces. As each closure member 20, 22 or 24 is in turn received within the opening 56, its respective closure injection passageway 50, 52 or 54 is registered and aligned with the mold injection passageway 42 to form a continuous inlet passageway means for molding material to pass from the exterior of the molding members to the interior molding cavity thereof.

Figure 2:
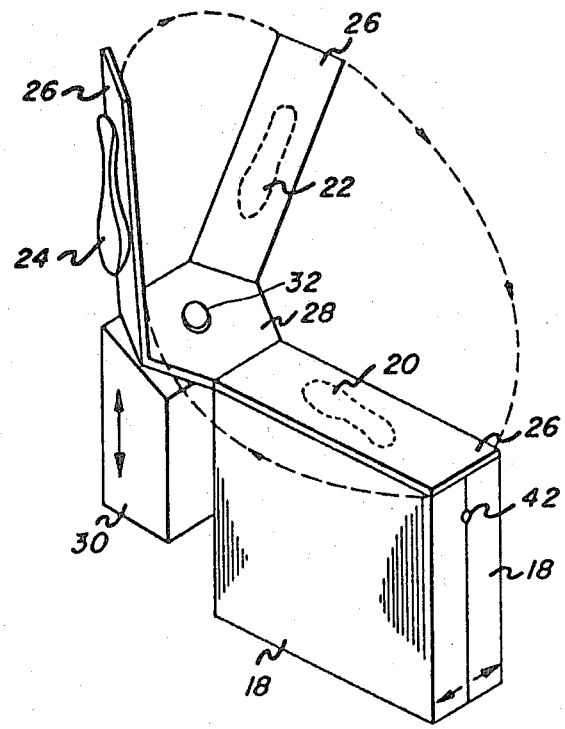
FIG. 2 is a perspective view of the mounting assembly for three closure members.

For the purpose of clarity, the closure members 20, 22 and 24 are not illustrated in FIG. 1, but are clearly shown in FIG. 2.

One means for mounting the closure members 20, 22 and 24 for selective cavity defining engagement with the lasting and side mold members is shown in FIG. 2. Each of the closure members 20, 22 and 24 is mounted on one of the arms 26 of a three-armed support member 28. The support member 28 is carried by an elevator member 30 which is mounted for selective vertical reciprocal movement, by means of an axle 32 secured to the support member 28. The elevator member 30 will be in a raised position when the side mold members 18 are away from the lasting member 16; and when the side mold members 18 are closed against the lasting member 16 the support member 28 is rotated on the axle 32 to position one of the three closure members 20, 22 or 24 directly above the lasting member 16 and side mold members 18 and elevator member 30 is lowered to lower the selected closure member in cavity defining position adjacent the lasting member. This latter position is disclosed in FIG. 2.

Three injection molding assemblages A, B, and C are positioned around the table. Such assemblages are well known in the art and each consists usually of an injection barrel 34 having an injection nozzle 36 and a feed screw or piston ram within the barrel to convey molding material along the barrel and out of the nozzle 36.

The table 12 is indexed to move from one position to the next to bring each of the stations 1 to 10 on the table into contact with each of the injection assemblages A, B and C in sequence. The rotation of the table may be automatic and controlled by a timing mechanism, or may be controlled by a push-button operation.

The lasting member 16, side mold 18 and closure members 20, 22 and 24 of each station may be provided with heating or cooling mechanisms, and the use thereof is dependent upon the nature of the molding material being used.

Figure 6:
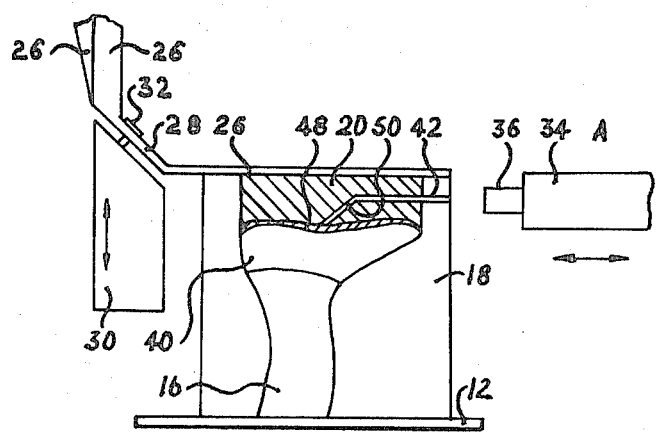
FIG. 6 is a vertical sectional view taken along the mold parting line at station 2 of FIG. 1, showing a modified step in the inventive method.

To manufacture an article of footwear according to one embodiment of this invention, a shoe insole 48 (FIG. 6) is positioned on the lasting member 16 at table station 1, at which position the side mold members 18 and closure members 20, 22, 24 are opened from the lasting member 16, and a shoe upper 40 is lasted (by string-lasting or slip-lasting) onto the lasting member. Alternatively, the insole and upper may have been conventionally pre-lasted before positioning on the lasting member. If required, pins or the like may be provided on the sole portion of the lasting member to hold the insole in position.

The side mold members are then closed (see table station 2 in FIG. 1) against the sides of the lasting member 16 carrying the upper and insole and the first closure member 20 positioned directly above the lasting member 16 and the elevator member 30 lowered to bring the first closure member 20 into contact (see FIGS. 2 and 3) with the lasting member and/or the side mold members to close the opening 56 and thus define a first molding cavity. This first molding cavity may be formed adjacent the heel-instep portion of the sole. The table is then rotated to table position 2 at which molding material is injected into the first cavity by the injection assemblage A. This results in the formation of a reinforcing insert on the lasted upper and insole.

The table is then indexed to table position 3 for cooling and solidification or partial solidification of the material injected by the injection assemblage A. The table then indexes to position 4 where the elevator member 30 is raised to raise the first closure member 20 above the lasting member 16 and side mold members 18. The support member 28 is then rotated to position the second closure member 22 above the lasting and side mold members and the elevator member is lowered to lower the second closure member 22 to define a second molding cavity. This second molding cavity may define the sole portion of the article (excluding the heel) and injection of the molding material by the injection assemblage B (after rotation to table position 5) will form the sole on the article being manufactured.

Position 6 is for cooling and partial solidification of the material injected by the assemblage B.

At position 7, a third molding cavity is provided by positioning the third closure member 24 in respect of the lasting and side mold members. This third closure member 24 defines a heel cavity, and injection into this third cavity forms a heel section on the molded sole layer and reinforcing insert.

Cooling may be effected at table position 9, with the side mold members and closure member opening at table position 10 to permit removal of the finished article from the last.

The formation of the three molding cavities described above is illustrated in FIGS. 3 through 5.

Figure 3:
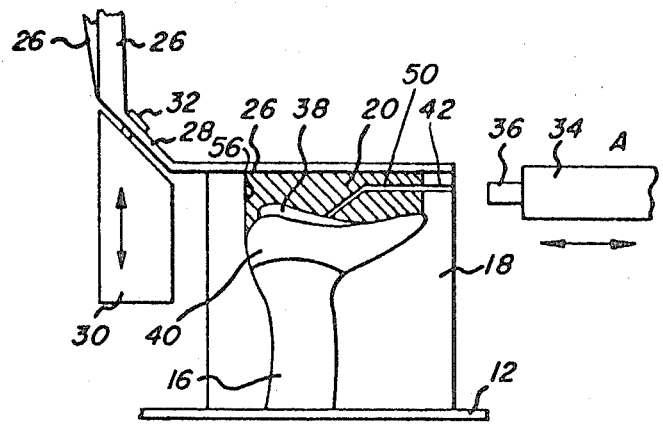
FIG. 3 is a vertical sectional view taken along the mold parting line at station 2 of FIG. 1.

FIG. 3 illustrates the first closure member 20 defining a cavity 38 adjacent the heel instep portion of a lasted upper 40. The molding material is injected into this cavity through ports or mold injected passageway 42 and first closure injection passageway 50 by injection assemblage A to form a shank reinforcement 38′ (FIG. 4) on the lasted upper 40 and insole.

Figure 4:
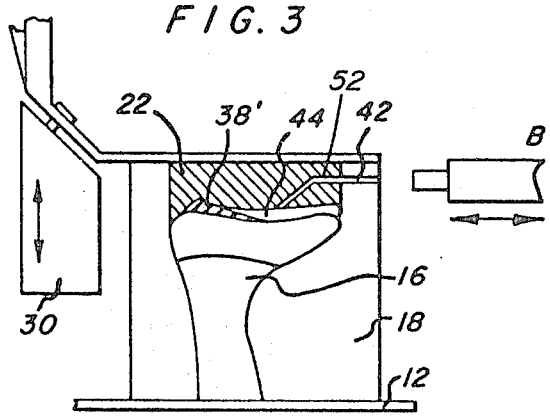
FIG. 4 is a vertical sectional view taken along the mold parting line at station 5 of FIG. 1.

FIG. 4 discloses the second closure member 22 forming a cavity 44 defining a sole adjacent the lasting member.

Molding material is injected into this cavity through the mold injection passageway 42 and second closure injection passageway 52 by the injection assemblage B to form a sole 44' (FIG. 5) on the lasted upper. The material previously injected into the cavity 38 is shown at 38'.

Figure 5:
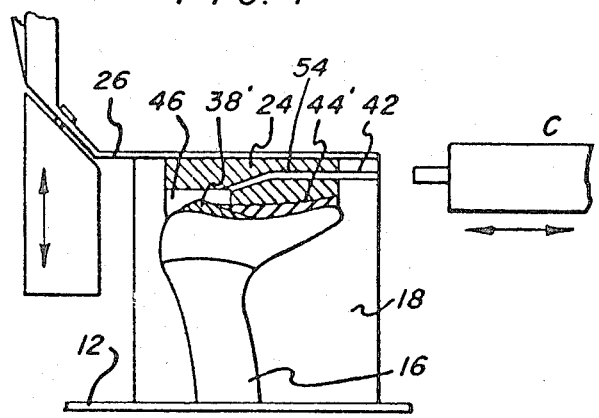
FIG. 5 is a vertical sectional view taken along the mold parting line at station 8 of FIG. 1.

FIG. 5 shows the third closure member 24 forming a cavity 46 defining a heel adjacent the lasting member 16. Molding material is injected into the cavity 46 by the injection assemblage C through mold injection passageway 42 and third closure injection passageway 54 to form a heel on the lasted upper 40. The material previously injected into the cavity 44 by the injection assemblage B is shown at 44'.

The molding materials injected by assemblages A, B and C may be identical or preferably may vary in chemical composition and/or physical characteristics, such as color, hardness, resiliency, etc. Accordingly in the embodiment described above the finished article could have a hard reinforcing insert, a hard durable heel and a softer more resilient sole section with all being of differing color if desired.

Molding materials suitable for use as injection materials are synthetics such as polypropylene, ethyl vinyl acetate, polystyrene, polyvinyl chloride, polyethylene, polyvinyl acetate and their compounds, various synthetic rubbers, and natural rubber compounds, etc.

Various modifications of the above embodiment are possible using the present invention. Some of these modifications are:

(1)

(a) Inject a reinforcing insert at injection assemblage A
(b) Inject a foxing strip around the whole sole-heel assembly at assemblage C (2)

(a) Inject a whole sole at injection assemblage A
(b) Inject a hard heel section at assemblage B
(c) Inject a hard toe section at assemblage C Other modifications of the first embodiment which utilizes a pre-made upper and insole are of course possible with appropriate changes in the surface configuration of the closure members being made to provide the necessary molding cavities at each injection station.

Figure 7:
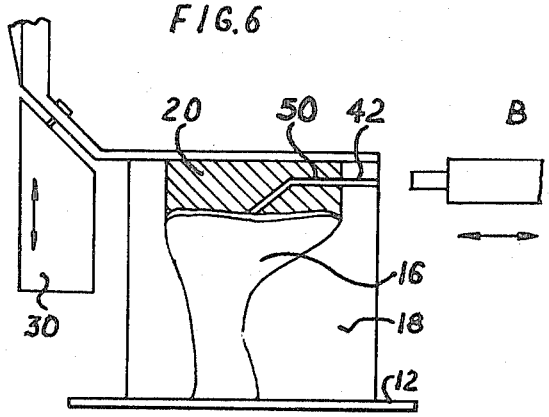
FIG. 7 is a vertical sectional view taken along the mold parting line at station 5 of FIG. 1, showing a further modified step in the inventive method.

A second embodiment covers the injection of an insole of soft foam or the like molding material at assemblage A directly onto the lasting member 16, as shown in FIG. 7. The injected insole cools at the table position 3, and the first upper closure member 20 and side mold members 18 are opened at the table position 4 (rather than remaining closed as in FIG. 1) to permit the lasting (stiring- or sliplasting) of a shoe upper 40 on the lasting member 16 at this location. The side mold members 18 and a second closure member 22 close on the lasting member 16 at the table position 5, and a shank reinforcement 38' (FIG. 3) is injected onto the lasted upper 40 by injection assemblage B. The mold members 18 and second closure member 22 remain closed at the table position 6, and at table station 7 the third closure member 24 replaces the second closure member 22, and at position 8 (injection assemblage C) a complete sole and heel assembly is injected.

An alternative to the above embodiment is to:

(1)

(a) Inject insole by assemblage A
(b) Last upper at the table position 4
(c) Inject a sole assembly by assemblage B
(d) Inject a hard heel assembly by assemblage C A third embodiment of the invention utilizes a conventional pre-cut insole blank.

The insole blank 48 (FIG. 6) is positioned on the lasting member 16 at table position 1, and may be held in position thereon by pins or the like provided on the lasting member, and a complete shoe upper 40 is injected onto the insole and lasting member at assemblage A. The closure members are changed at the table position 4, and a shank reinforcement 38' (FIG. 4) is injected onto the injected upper at assemblage B. A third closure member 24 is positioned at the table position 7, and a complete heel and sole assembly is injected at assemblage C.

Alternatives of the above embodiment are as follows:

(1)

(a) Position insole at the table position 1
(b) Inject shoe upper at assemblage A
(c) Inject a shoe sole at assemblage B
(d) Inject a hard heel (or hard heel and toe reinforcement) at assemblage C (2)

(a) Position insole at the table position 1
(b) Inject shoe upper at assemblage A
(c) Inject sole-heel assembly at assemblage B
(d) Inject a foxing strip onto the sole-heel injected layer at assemblage C A fourth embodiment provides for the injection of a soft foam or the like insole at the table position 2 (injection station A). A complete shoe upper is then injected at injection assemblage B, and a complete sole-heel assembly injected at assemblage C.

A fifth embodiment provides for the injection of a complete shoe upper-insole combination at assemblage A. A reinforcing shank is injected at assemblage B, and a complete sole-heel assembly at assemblage C. With this embodiment, it is possible to produce an article of footwear consisting completely of injected molding materials, injected at three different stations.

An alternative of this embodiment provides for the injection of a combination upper-insole at assemblage A, the injection of a complete sole-heel assembly at assemblage B, and the injection of a colored foxing strip at assemblage C.

In another alternative, a combination upper-insole is injected at assemblage A, a sole assembly at assemblage B, and a hard heel or heel and toe section at assemblage C.

The above embodiments will serve to illustrate the many different procedures for building articles of footwear possible with the three-stage injection method according to the invention. It will be understood that the above embodiments and alternatives are not recited in a limiting sense but only as exemplary.

The specific design and surface configuration of the three upper closure members will depend upon the proceduce chosen.

In the present apparatus the closure members, the side mold members and lasting members may quickly be changed to different sizes and shapes to enable the molding of various size footwear.

It is preferred to practice the three-stage injection method with multiple station apparatus as shown in the drawings, but the method can be practiced on a single-station stationary machine with provision being made for the injection of the three molding materials.

What is claimed is:

1. A method for the manufacture of articles of footwear or parts thereof, comprising the steps of:
  (a) positioning a stationary lasting member and a pair of opposed side mold members to form a molding cavity having an opening thereinto, the side mold members defining a mold injection passageway extending from the exterior thereof to the periphery of the opening;
  (b) positioning a first closure member within the opening to close the molding cavity, the first closure member having a first molding surface on the interior thereof and a first closure injection passageway extending from the exterior thereof to the first molding surface, said positioning including aligning and registering the first closure injection passageway with the mold injection passageway;

(c) injecting a first molding material through the mold injection passageway and the first closure injection passageway into the molding cavity;

(d) removing the first closure member from the opening while permitting the first molding material to cool to a semi-solid state;

(e) positioning a second closure member within the opening to close the molding cavity, the second closure member having a second molding surface on the interior thereof and a second closure injection passageway extending from the exterior thereof to the second molding surface, said positioning including aligning and registering the second closure injection passageway with the mold injection passageway;

(f) injecting a second molding material through the mold injection passageway and the second closure injection passageway into the molding cavity in contact with the first molding material, the second molding material thereby being bonded to the semi-solid first molding material;

(g) removing the second closure member from the opening while permitting the second molding material to cool to a semi-solid state;

(h) positioning a third closure member within the opening to close the molding cavity, the third closure member having a third molding surface on the interior thereof and a third closure injection passageway extending from the exterior thereof to the third molding surface, said positioning including aligning and registering the third closure injection passageway with the mold injection passageway;

(i) injecting a third molding material through the mold injection passageway and the third closure injection passageway into the molding cavity in contact with the second molding material, the third molding material thereby being bonded to the semi-solid second molding material;

(j) removing the third closure member from the enlarged opening; and (k) cooling the formed article and removing it from the mold.

2. The method as claimed in claim 1 wherein the first, second and third molding materials differ in chemical composition.

3. A method as defined in claim 1, further comprising the step of positioning a shoe insole adjacent the lasting member during positioning of the pair of opposed side mold members.

4. The method as claimed in claim 3 wherein the second closure member defines a shank reinforcement cavity adjacent the insole on the last and the third closure member a sole and heel cavity adjacent the insole.

5. The method as claimed in claim 3 wherein the second closure member defines a sole cavity adjacent the insole and the third closure member a heel cavity.

6. The method as claimed in claim 3 wherein the second closure member defines sole-heel cavity adjacent the insole and the third closure member a foxing strip.

7. A method as defined in claim 1, further comprising the step of positioning a shoe insole and upper adjacent the lasting member during positioning of the pair of opposed side mold members.

8. The method as claimed in claim 7 wherein the first closure member defines a sole cavity adjacent the shoe insole and upper, the second closure member a heel cavity section, and the third closure member a foxing strip cavity.

9. The method as claimed in claim 7 wherein the first closure member defines a reinforcement insert cavity adjacent the insole and upper, the second closure member a sole cavity, and the third closure member a heel cavity.

10. The method as claimed in claim 7 wherein the first, second and third molding materials differ in chemical composition.

11. A method as defined in claim 1, wherein the first molding material forms a molded insole, and further comprising the step of positioning a shoe upper on the molded insole following removal of the first closure member.

12. The method as claimed in claim 11 wherein the second closure member defines a reinforcement insert cavity adjacent the molded insole, and the third closure member a sole-heel cavity.

13. The method as claimed in claim 11 wherein the second closure member defines a sole cavity adjacent the molded insole, and the third closure member a heel cavity.

References Cited

UNITED STATES PATENTS

| | | | |
|---|---|---|---|
| 3,302,243 | 2/1967 | Ludwig | 264—244 |
| 3,305,895 | 2/1967 | Ludwig | 264—244 |
| 3,319,301 | 5/1967 | Ludwig | 264—244 |
| 3,463,849 | 8/1969 | Winkler | 264—244 |
| 3,555,609 | 1/1971 | Chu et al. | 264—244 |

ROBERT F. WHITE, Primary Examiner

J. R. HALL, Assistant Examiner

U.S. Cl. X.R.

264—254, 255